(12) United States Patent
Webster et al.

(10) Patent No.: US 8,848,812 B2
(45) Date of Patent: *Sep. 30, 2014

(54) MIXED WAVEFORM CONFIGURATION FOR WIRELESS COMMUNICATIONS

(75) Inventors: Mark A Webster, Indian Harbour Beach, FL (US); Michael J Seals, Melbourne, FL (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/330,946

(22) Filed: Dec. 20, 2011

(65) Prior Publication Data

US 2012/0087311 A1    Apr. 12, 2012

Related U.S. Application Data

(60) Division of application No. 12/164,930, filed on Jun. 30, 2008, now Pat. No. 8,085,874, which is a continuation of application No. 10/143,126, filed on May 10, 2002, now Pat. No. 7,394,864.

(60) Provisional application No. 60/303,444, filed on Jul. 6, 2001.

(51) Int. Cl.
| | |
|---|---|
| *H04L 27/28* | (2006.01) |
| *H04L 27/00* | (2006.01) |
| *H04L 27/26* | (2006.01) |
| *H04L 25/02* | (2006.01) |
| *H04L 27/34* | (2006.01) |
| *H04L 25/03* | (2006.01) |
| *H04W 84/12* | (2009.01) |

(52) U.S. Cl.
CPC ....... *H04L 27/34* (2013.01); *H04L 2025/03401* (2013.01); *H04L 27/0008* (2013.01); *H04L 27/2601* (2013.01); *H04W 84/12* (2013.01); *H04L 25/0212* (2013.01); *H04L 2025/03414* (2013.01); *H04L 25/03006* (2013.01)
USPC .......................................... 375/260; 375/315

(58) Field of Classification Search
USPC .................. 375/298, 300–307, 315, 320–328
See application file for complete search history.

(56) References Cited

U.S. PATENT DOCUMENTS

| | | |
|---|---|---|
| 5,251,545 A | 10/1993 | Wetzel |
| 5,343,498 A | 8/1994 | Toy et al. |

(Continued)

FOREIGN PATENT DOCUMENTS

| | | |
|---|---|---|
| JP | 2000-101623 | 7/2000 |
| WO | WO-03/005652 | 1/2003 |

OTHER PUBLICATIONS

International Preliminary Report on Patentability for PCT/US02/21092, completed Oct. 26, 2005.

(Continued)

*Primary Examiner* — Sam K Ahn
*Assistant Examiner* — Janice Tieu

(57) ABSTRACT

A mixed waveform configuration for wireless communications including a first portion that is modulated according to a single-carrier modulation scheme and a second portion that is modulated according to a multi-carrier modulation scheme. The waveform is specified so that a channel impulse response (CIR) estimate obtainable from the first portion is reusable for acquisition of the second portion. The first portion includes a preamble and header and the second portion typically incorporates the payload.

17 Claims, 20 Drawing Sheets

(56) References Cited

U.S. PATENT DOCUMENTS

| | | | | |
|---|---|---|---|---|
| 5,371,548 | A | * | 12/1994 | Williams ............... 348/478 |
| 5,425,050 | A | | 6/1995 | Schreiber et al. |
| 5,732,113 | A | | 3/1998 | Schmidl et al. |
| 5,796,772 | A | | 8/1998 | Smith et al. |
| 5,970,092 | A | | 10/1999 | Currivan |
| 5,982,807 | A | * | 11/1999 | Snell ..................... 375/146 |
| 6,067,391 | A | | 5/2000 | Land |
| 6,074,086 | A | | 6/2000 | Yonge, III |
| 6,108,517 | A | | 8/2000 | Arslan et al. |
| 6,128,276 | A | | 10/2000 | Agee |
| 6,130,894 | A | * | 10/2000 | Ojard et al. ............ 370/421 |
| 6,272,627 | B1 | * | 8/2001 | Mann ........................ 713/2 |
| 6,278,883 | B1 | | 8/2001 | Choi |
| 6,298,035 | B1 | | 10/2001 | Heiskala |
| 6,344,807 | B1 | | 2/2002 | Hassner et al. |
| 6,397,368 | B1 | * | 5/2002 | Yonge et al. ............ 714/792 |
| 6,434,119 | B1 | | 8/2002 | Wiese et al. |
| 6,567,374 | B1 | * | 5/2003 | Bohnke et al. ........... 370/203 |
| 6,628,735 | B1 | | 9/2003 | Belotserkovsky et al. |
| 6,775,340 | B1 | | 8/2004 | Arslan et al. |
| 6,865,174 | B1 | | 3/2005 | Tsubouchi et al. |
| 6,898,253 | B2 | | 5/2005 | McNally |
| 7,010,062 | B2 | | 3/2006 | Joshi et al. |
| 7,110,744 | B2 | | 9/2006 | Freeny, Jr. |
| 7,394,864 | B2 | | 7/2008 | Webster et al. |
| 2001/0024475 | A1 | | 9/2001 | Kumar |
| 2002/0127982 | A1 | | 9/2002 | Haapoja et al. |
| 2003/0012302 | A1 | | 1/2003 | Webster et al. |
| 2003/0032390 | A1 | | 2/2003 | Geile et al. |
| 2005/0094640 | A1 | | 5/2005 | Howe |

OTHER PUBLICATIONS

Non-Final Office Action on U.S. Appl. No. 12/164,930, mailed Mar. 9, 2011.

Notice of Allowance on U.S. Appl. No. 12/164,930, mailed Aug. 22, 2011.

Halford et al., "IEEE P802.11 Wireless LANSs, CCK-OFDM Proposed Normative Text," Jul. 10, 2001, XP02242971, Retrieved from the Internet: <URL: http://grouper.ieee.org/groups/802/11/Documents/D1T401.

Crochiere et al., "Interpolation and Decimation of Digital Signals—A Tutorial Review," Proceeding of the IEEE, IEEE. New York, US vol. 69, No. 3, Mar. 1, 1981, pp. 300-331.

Adams, R, "Asynchronous Conversion Thwarts Incompatibility in Sampling A/D Systems," EDN Electrical Design News, Cahners Publishing Co. Newton, Massachusetts, US, vol. 39, No. 15, Jul. 21, 1994, pp. 83-88, XP000491530, ISSN: 0012-7515, section "Synchronous rate-conversion theory,".

International Search Report for WO 03/005740 dated Mar. 24, 2003.

Webster et al., "Reuse of 802.11 Preambles withHRb OFDM," IEEE 802.11-00/390, Nov. 1, 2000, pp. 1-36.

Lambrette et al., "OFDM Burst Frequency Synchronization by Single Carrier Training Data," IEEE Communications Letters, IEEE Service Center, Piscataway, U.S. vol. 1., No. 2, Mar. 1, 1997.

"Supplement to IEEE standard for information technology—telecommunications and information exchange between systems—local and metropolitan area networks—specific requirements. Part 11: wireless LAN Medium Access Control (MAC) and Physical Layer (PHY) specifications: high-speed physical layer in the 5 GHZ Band," IEEE STD 802.11A-1999, Dec. 30, 1999, pp. 1-90.

"Draft Supplement to Standard (for) Information Technology—Telecommunications and information exchange between systems—Local and metropolitan area networks—Specific Requirements—Par 11: Wireless LAN Medium Access Control (MAC) and Physical Layer (PHY) specifications: High Speed Physical Layer in the 5 GHz Band," IEEE p802.11A/d7.0 (Supplement to IEEE Std. 802.11-1999), Jul. 1999.

"Information technology—Telecommunications and information exchange between systems—Local and metropolitan area networks,—Specific requirements—Part 11: Wireless LAN Medium Access Control (MAC) and Physical Layer (PHY) Specifications," ISO/IEC 8802-11.1999(E) ANSI/IEEE Std 802.11, 1999 Edition, Aug. 1999, 531 pages.

\* cited by examiner

Associated Infinite-Duration Time Response

$$h_{IdealBW}(t) = f_W \frac{\sin(\pi f_W t)}{\pi f_W t} = f_W \mathrm{sinc}(f_W t), \text{ where } f_W = 52(20/64) \text{ MHz}$$

Brickwall Spectrum

$$h_{Window}(t) = 0.5\left[1+\cos\left(2\pi\frac{t}{T_{SPAN}}\right)\right], \text{ where } T_{SPAN} = 0.8 \text{ usecs}$$

$$w_T(t) = \sin^2\left[\frac{\pi}{2}\left(0.5 + \frac{t}{T_{TR}}\right)\right] \quad \text{for} \quad \left(-\frac{T_{TR}}{2} < t < \frac{T_{TR}}{2}\right)$$

$$w_T(t) = 1 \quad \text{for} \quad \left(\frac{T_{TR}}{2} < t < T - \frac{T_{TR}}{2}\right)$$

$$w_T(t) = \sin^2\left[\frac{\pi}{2}\left(0.5 - \frac{(t-T)}{T_{TR}}\right)\right] \quad \text{for} \quad \left(T - \frac{T_{TR}}{2} < t < T + \frac{T_{TR}}{2}\right)$$

where TTR is the transition duration

MIXED WAVEFORM CONFIGURATION FOR WIRELESS COMMUNICATIONS

CROSS-REFERENCE TO RELATED PATENT APPLICATIONS

This application is a Divisional of U.S. application Ser. No. 12/164,930, filed Jun. 30, 2008, which is a continuation of U.S. application Ser. No. 10/143,126, filed May 10, 2002 (now U.S. Pat. No. 7,394,864), which claims priority from Provisional Application U.S. Application No. 60/303,444, filed Jul. 6, 2001 all of which are incorporated herein by reference in their entirety.

FIELD OF THE INVENTION

The present invention relates to wireless communications and more particularly to a single-carrier to multi-carrier mixed signal configuration for use in wireless communications.

BACKGROUND OF THE INVENTION

The Institute of Electrical and Electronics Engineers, Inc. (IEEE) 802.11 standard is a family of standards for wireless local area networks (WLAN) in the unlicensed 2.4 and 5 Gigahertz (GHz) bands. The current 802.11b standard defines various data rates in the 2.4 GHz band, including data rates of 1, 2, 5.5 and 11 Megabits per second (Mbps). The 802.11b standard uses direct sequence spread spectrum (DSSS) with a chip rate of 11 Megahertz (MHz), which is a serial modulation technique. The 802.11a standard defines different and higher data rates of 6, 12, 18, 24, 36 and 54 Mbps in the 5 GHz band. It is noted that systems implemented according to the 802.11a and 802.11b standards are incompatible and will not work together.

A new standard is being proposed, referred to as 802.11g (the "802.11g proposal"), which is a high data rate extension of the 802.11b standard at 2.4 GHz. It is noted that, at the present time, the 802.11g proposal is only a proposal and is not yet a completely defined standard. Several significant technical challenges are presented for the new 802.11g proposal. It is desired that the 802.11g devices be able to communicate at data rates higher than the standard 802.11b rates in the 2.4 GHz band. In some configurations, it is desired that the 802.11b and 802.11g devices be able to coexist in the same WLAN environment or area without significant interference or interruption from each other, regardless of whether the 802.11b and 802.11g devices are able to communicate with each other. It may further be desired that the 802.11g and 802.11b devices be able to communicate with each other, such as at any of the standard 802.11b rates.

A dual packet configuration for wireless communications has been previously disclosed in U.S. patent application entitled, "A Dual Packet Configuration for Wireless Communications", application Ser. No. 09/586,571 filed on Jun. 2, 2000, which is hereby incorporated by reference in its entirety. This previous system allowed a single-carrier portion and an orthogonal frequency division multiplexing (OFDM) portion to be loosely coupled. Loosely coupled meant that strict control of the transition was not made to make implementations simple by allowing both an existing single-carrier modem and an OFDM modem together with a simple switch between them with a minor conveyance of information between them (e.g., data rate and packet length). In particular, it was not necessary to maintain strict phase, frequency, timing, spectrum (frequency response) and power continuity at the point of transition (although the power step would be reasonably bounded). Consequently, the OFDM system needed to perform an acquisition of its own, separate from the single-carrier acquisition, including re-acquisition of phase, frequency, timing, spectrum (including multi-path) and power (Automatic Gain Control [AGC]). A short OFDM preamble following the single carrier was used in one embodiment to provide reacquisition.

An impairment to wireless communications, including WLANs, is multi-path distortion where multiple echoes (reflections) of a signal arrive at the receiver. Both the single-carrier systems and OFDM systems must include equalizers that are designed to combat this distortion. The single-carrier system designs the equalizer on its preamble and header. In the dual packet configuration, this equalizer information was not reused by the OFDM receiver. Thus, the OFDM portion employed a preamble or header so that the OFDM receiver could reacquire the signal. In particular, the OFDM receiver had to reacquire the power (AGC), carrier frequency, carrier phase, equalizer and timing parameters of the signal.

Interference is a serious problem with WLANs. Many different signal types are starting to proliferate. Systems implemented according to the Bluetooth standard present a major source of interference for 802.11-based systems. The Bluetooth standard defines a low-cost, short-range, frequency-hopping WLAN. Preambles are important for good receiver acquisition. Hence, losing all information when transitioning from single-carrier to multi-carrier is not desirable in the presence of interference.

There are several potential problems with the signal transition, particularly with legacy equipment. The transmitter may experience analog transients (e.g., power, phase, filter delta), power amplifier back-off (e.g. power delta) and power amplifier power feedback change. The receiver may experience AGC perturbation due to power change, AGC perturbation due to spectral change, AGC perturbation due to multi-path effects, loss of channel impulse response (CIR) (multi-path) estimate, loss of carrier phase, loss of carrier frequency, and loss of timing alignment.

SUMMARY OF THE INVENTION

A mixed waveform configuration for wireless communications according to an embodiment of the present invention includes a first portion that is modulated according to a single-carrier modulation scheme and a second portion that is modulated according to a multi-carrier modulation scheme. The waveform is specified so that a channel impulse response (CIR) estimate obtainable from the first portion is reusable for acquisition of the second portion. The first portion includes a preamble and header and the second portion typically incorporates the payload.

In one configuration, the single-carrier modulation scheme uses a first sample rate and the multi-carrier modulation scheme uses a second sample rate that is greater than the first sample rate. In a specific embodiment, for example, the first sample rate is approximately 11 megahertz (MHz) and the second sample rate is approximately 20 MHz. The linear distortions of the first and second portions of the waveform may be assumed to be common.

The power, carrier phase, carrier frequency, timing, and multi-path spectrum may be substantially maintained between the first portion and the second portion of the waveform. One way to facilitate this goal is to employ a single-carrier spectrum that resembles a multi-carrier spectrum of the multi-carrier modulation scheme in the single-carrier modulation scheme. For example, the single-carrier spectrum has a dominant peak in its impulse response with a relatively small amount of spread. In particular configurations, the single-carrier spectrum has a nearly flat spectrum with sufficiently steep roll-off on its edges, or the single-carrier spectrum employs a time shaping pulse that is specified in continuous time. The time shaping pulse may have a relatively short duration. The time shaping pulse may be derived by employing an infinite impulse response of a brick wall approximation that is truncated using a continuous-time window. It is desired that the continuous-time window be sufficiently long to achieve the desired spectral characteristics and sufficiently short to minimize complexity. In a specific embodiment, the continuous-time window is a continuous time version of a Hanning window. The time shaping pulse may be sampled according to a Nyquist criterion. In one configuration, the time shaping pulse is sampled and decomposed using first and second polyphase digital filters to achieve a 22 MHz sample rate. In an alternative embodiment, the time shaping pulse is sampled and decomposed using twenty polyphase digital filters and by taking 1 of 11 outputs of the twenty polyphase digital filters to achieve a 20 MHz sample rate.

The first portion may be modulated with a single-carrier modulation scheme kernel, and the second portion may be modulated with a multi-carrier modulation scheme kernel. In this case, the average output signal power of the single-carrier modulation scheme kernel and the average output signal power of the multi-carrier modulation scheme kernel are maintained substantially equal. In a specific configuration, the single-carrier modulation scheme is according to 802.11b Barkers and the multi-carrier modulation scheme is according to the 802.11a standard employing orthogonal frequency division multiplexing (OFDM).

The single-carrier modulation scheme may employ a first sample rate clock while the multi-carrier modulation scheme employs a second sample rate clock. In this case, the first and second sample rate clocks are aligned at predetermined timing intervals. In one embodiment, a first full sample of the multi-carrier modulation scheme begins one timing interval after the beginning of the last sample of the single-carrier modulation scheme. In a specific embodiment, the single-carrier modulation scheme uses 11 chip Barker words at an 11 MHz sample rate and the multi-carrier modulation scheme uses OFDM at a 20 MHz sample rate. For the Barker words, each predetermined timing interval is approximately 1 microsecond and the Barker chips are centered on the timing intervals. In this case, the first full OFDM sample occurs at approximately 1 microsecond after a zero-phase peak of a first chip of the last Barker word of the first portion of the waveform.

In one configuration, the single-carrier signal is terminated according to a windowing function specified for OFDM signal shaping defined in the 802.11a standard. The first portion single-carrier signal may be terminated in a specified time, such as nominally 100 nanoseconds. The carrier frequency may be coherent between the first portion single-carrier signal and the second portion multi-carrier signal. The carrier phase may be coherent between the first portion single-carrier signal and the second portion multi-carrier signal. Carrier phase of the multi-carrier signal may be determined by carrier phase of a last portion of the single-carrier signal. The carrier phase of the multi-carrier signal may be rotated by a corresponding one of a plurality of rotation multiples, where each rotation multiple corresponds to one of a plurality of predetermined phases of the last portion of the single-carrier signal. In a specific embodiment, for example, the single-carrier modulation scheme is according to 802.11b Barkers in which each Barker word is one of first, second, third and fourth possible phases, and the multi-carrier modulation scheme is according to OFDM as defined in Annex G of the 802.11a standard. In this case, the OFDM samples are rotated by zero if the last Barker word has the first phase, by 90 degrees if the last Barker word has the second phase, by 180 degrees if the last Barker word has the third phase, and by −90 degrees if the last Barker word has the fourth phase.

The requisite fidelity for the entire waveform may be specified by a requisite fidelity specified for the multi-carrier modulation scheme. The requisite fidelity may be a function of data rate of the multi-carrier portion. The requisite fidelity may be determined by mean-squared-error normalized by signal power as specified for OFDM in the 802.11a standard.

The symbol rate clock and a carrier frequency of the waveform may be derived from the same reference clock. In one configuration, a part per million (PPM) error of a clock fundamental for symbol rate and PPM error of a clock fundamental for carrier frequency are substantially equal.

BRIEF DESCRIPTION OF THE DRAWINGS

A better understanding of the present invention can be obtained when the following detailed description of the preferred embodiment is considered in conjunction with the following drawings, in which:

FIG. 6B is a graph diagram of a plot of the composite PSD of the 52 non-zero sub-carriers used in 802.11a.

FIG. 21 is a graph diagram illustrating exemplary single-carrier termination, shaped consistent with 802.11a, and OFDM onset shaped identical to 802.11a.

DETAILED DESCRIPTION OF THE PREFERRED EMBODIMENTS

A configuration according to the present invention reuses the equalizer information obtained during acquisition of the single-carrier portion of the signal. In this manner, no OFDM preamble is required, although it still may be present for both convenience and fine tuning. The present disclosure describes a technique for providing complete continuity between the single-carrier and OFDM (multi-carrier) segments. This continuity is provided by specifying the transmit waveform completely for both the single-carrier and OFDM segments and specifying the transition. This enables complete continuity between the two signal segments, including AGC (power), carrier phase, carrier frequency, timing and spectrum (multi-path). In this manner, the signal does not have to be reacquired by the multi-path portion of the receiver since the information developed during the single-carrier portion (preamble/header) is valid and used to initiate capture of the multi-carrier portion. Maintaining and accumulating information makes the signal much more robust in the face of common interferences experience in wireless communications.

Figure 1:
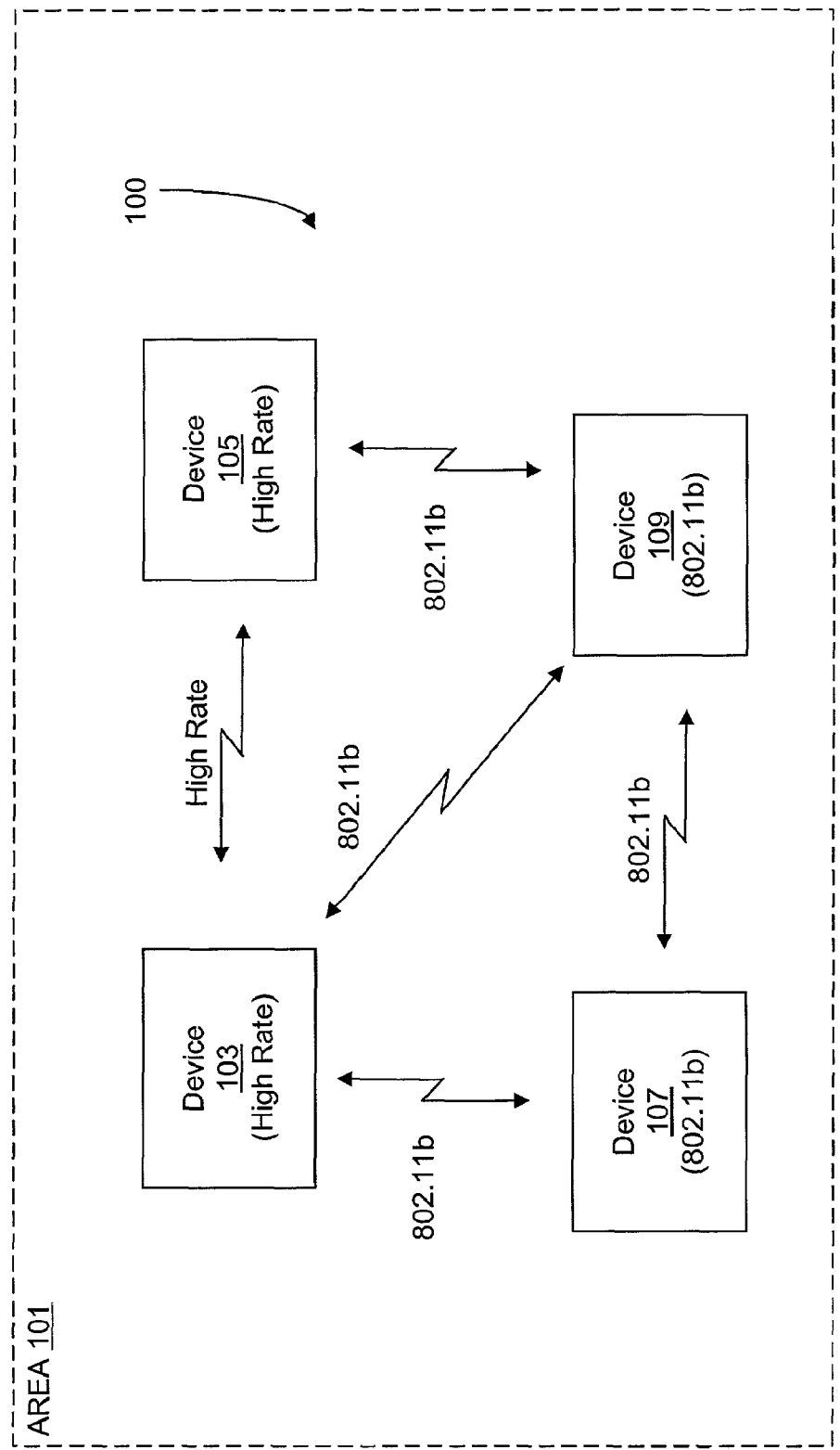
FIG. 1 is a block diagram of a WLAN system including four devices operating within the same room or area, where two of the devices are implemented according to the 802.11b standard and the other two are implemented according to the 802.11g proposal.

FIG. 1 is a block diagram of a wireless local area network (WLAN) system 100 operating within a particular room or area 101, including four WLAN devices 103, 105, 107 and 109 (103-109) are located within the area 101. The devices 103 and 105 are implemented according to at least one of several embodiments of the present invention with the 802.11g proposal in mind, whereas the devices 107 and 109 are implemented according to the 802.11b standard. All of the devices 103-109 operate in the 2.4 GHz band. The devices 103-109 may be any type of wireless communication device, such as any type of computer (desktop, portable, laptop, etc.), any type of compatible telecommunication device, any type of personal digital assistant (PDA), or any other type of network device, such as printers, fax machines, scanners, hubs, switches, routers, etc. It is noted that the present invention is not limited to the 802.11g proposal, the 802.11b standard, the 802.11a standard or the 2.4 GHz frequency band, although these standards and frequencies may be utilized in certain embodiments.

The devices 107 and 109 communicate with each other at any of the standard 802.11b rates, including 1, 2, 5.5 and 11 Mbps. The devices 103 and 105 are mixed signal mode devices that communicate with each other at different or higher data rates using a mixed signal configuration according to any one of several embodiments, such as the standard 802.11a data rates of 6, 9, 12, 18, 24, 36, 48 or 54 Mbps. Alternative data rate groups are considered herein. The second group is advantageous as including two of the 802.11b standard data rates, namely 5.5 and 11 Mbps.

In one or more first embodiments, the mixed signal devices 103-109 may operate or coexist in the same area 101 without significant interference from each other, where the devices 103, 105 communicate with each other at different or higher data rates than the 802.11b devices 107, 109. In the first embodiments, the devices 103, 105 may communicate with each other while the devices 107, 109 may communicate with each other, but the devices 103, 105 do not communicate with the devices 107, 109. In one or more second embodiments, at least one of the mixed signal devices 103, 105 is configured with a standard mode to be able to communicate with either of the devices 107, 109 at any one or more of the standard 802.11b data rates. In at least one third embodiment, the mixed signal devices 103, 105 communicate at different or higher data rates and are incompatible with the devices 107 and 109, so that the devices 103-109 are not able to coexist within the same area 101. The mixed signal devices 103, 105 may be implemented to operate in the 2.4 GHz band, although other frequency bands are contemplated.

In the first or second embodiments, it is desired that the devices 103 and 105 be able to communicate with each other without interruption or interference from either of the devices 107 and 109. This presents a significant technical challenge since the devices 103, 105 operate at different data rates when communicating with each other. The present invention solves this problem by enabling the devices 103 and 105 to be implemented to be able to communicate with each other at different or at higher data rates while residing in a same area 101 as the 802.11b devices 107, 109. Further, in the second embodiments the devices 103, 105 may also communicate with either of the devices 107, 109 at the 802.11b data rates.

Figure 2:
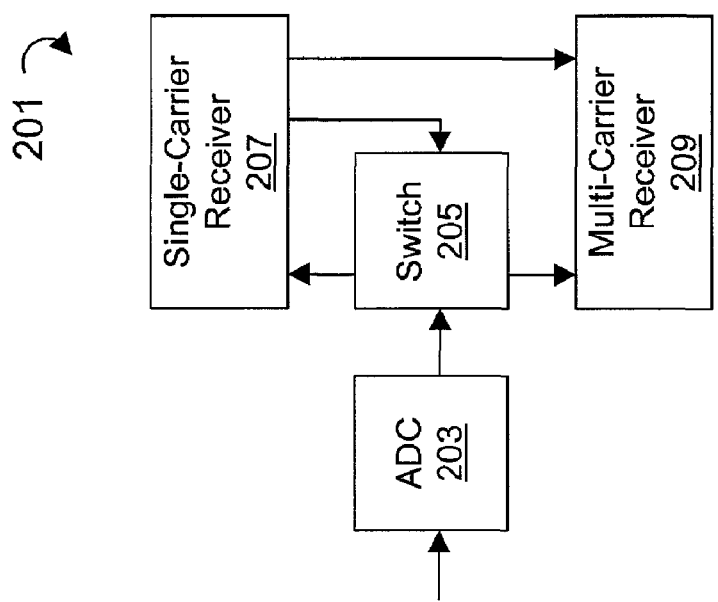
FIG. 2 is a block diagram of a mixed signal receiver implemented according to an embodiment of the present invention that may be used in either or both of the high rate devices of FIG. 1.

FIG. 2 is a block diagram of a mixed signal receiver 201 implemented according to an embodiment of the present invention that may be used in either or both of the devices 103, 105. The incoming signal is received by an automatic gain control (AGC) 203 that adjusts receive power and provides a corresponding signal to a switch 205. The switch 205 initially provides the received signal to a single-carrier receiver 207. The single-carrier receiver 207 includes an equalizer and other circuitry that analyzes the predetermined preamble of the received signal compared to known data and "learns" the parameters associated with the multi-path medium through which the signal was propagated. The single-carrier receiver 207 also examines the header to determine if the packet is intended for the mixed signal receiver 201 and if the packet is a mixed packet, and if so, causes the switch 205 to provide the remaining portion of the incoming signal to a multi-carrier receiver 209. It is noted that the header includes a mixed mode identifier (not shown), such as a mode bit or the like, that identifies the packet as a mixed mode packet. Thus, in one embodiment, the single-carrier receiver 207 determines that the packet is intended for the mixed signal receiver 201 from a destination address or the like, and determines that the packet is a mixed mode packet from the mode identifier. If the packet is intended for the mixed signal receiver 201 but is not a mixed mode packet (e.g., a standard 802.11b packet), then the single-carrier receiver 207 continues to process the packet. A length field is also provided in the header which includes a length value that identifies the total length of the mixed mode packet. Thus, any device, including mixed mode or legacy devices (e.g. 802.11b devices), may determine that the packet is not intended for it, and backs-off by an amount of time corresponding to the length value.

The multi-carrier receiver 209 is configured to receive the signal, which is transmitted according to OFDM or the like. The multi-carrier receiver 209 is coupled to the single-carrier receiver 207 so that the multi-path information determined by the single-carrier receiver 207 is re-used to enable a smooth transition between the packet portions of the incoming signal. In particular, the AGC (power), carrier frequency, carrier phase, equalizer, and timing parameters from the single-carrier receiver 207 are used by the multi-carrier receiver 209 to receive the incoming signal. The OFDM multi-carrier receiver 209 need not re-acquire the signal, since the information used by the single-carrier receiver 207 is obtained and used.

Figure 3:
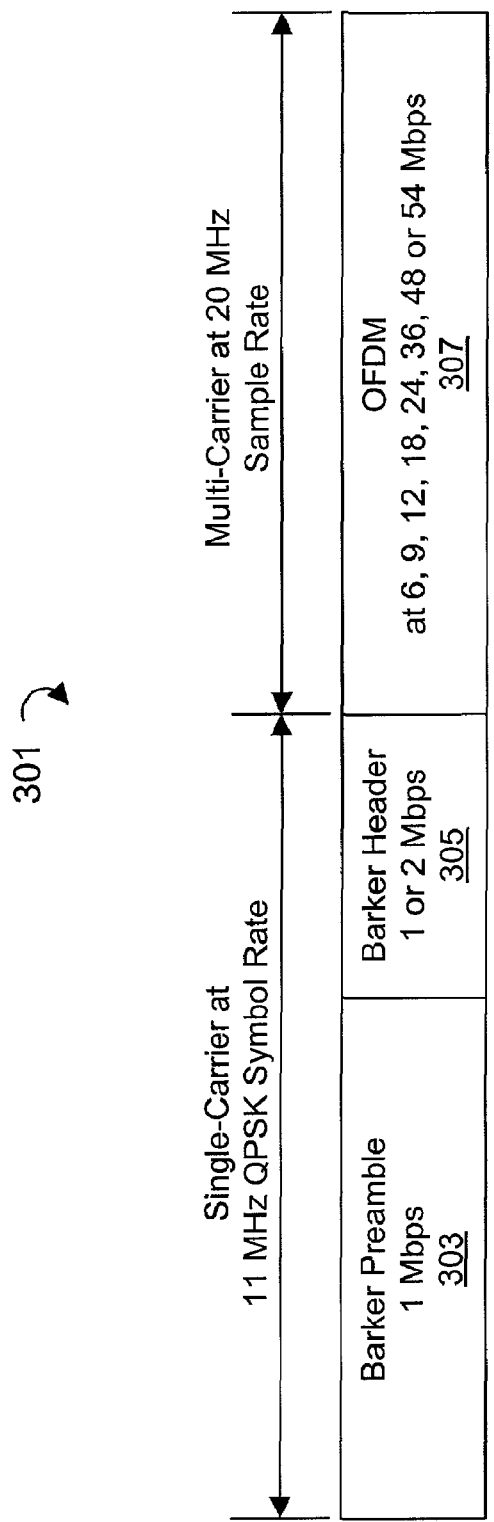
FIG. 3 is a conceptual diagram of a mixed signal packet implemented according to an embodiment of the present invention.

FIG. 3 is a conceptual diagram of a mixed signal packet 301 implemented according to an embodiment of the present invention. The packet 301 includes a Barker Preamble 303, which is transmitted at 1 megabits per second (Mbps), followed by a Barker Header 305, which is transmitted at 1 or 2 Mbps, followed by one or more OFDM symbols 307 incorporating payload data, which is transmitted at any selected data rate from among typical data rates of 6, 9, 12, 18, 24, 36, 48 or 54 Mbps with a selected sample rate of 20 megahertz (MHz). The preamble 303 and header 305 are transmitted with a single carrier at the 11 MHz Quadrature Phase Shift Keying (QPSK) symbol rate (and Binary Phase Shift Keying [BPSK] is also contemplated). Different OFDM sample rates are contemplated, such as 18.333 megahertz (MHz), 22 MHz, etc., in which the same principles apply. The transmit signal is specified for complementary code keying OFDM, or CCK-OFDM (802.11b preamble and header using Barkers [single carrier] followed by OFDM [multi-carrier]). The OFDM portion of the waveform can optionally be one of several effective sample rates (e.g., 22, 20, or 18.33 MHz). The packet 301 is shown employing the 802.11a sample rate of 20 MHz. The goal is to specify the signal so that the channel impulse response (CIR) estimate obtained on the preamble and header is reusable on the OFDM. Hence, the transition is completely specified, with no free variables, which allows important equalizer information to be retained at switch-over. Also, it is desirable to eliminate receiver power changes due to the signal transition. A power step may cause legacy equipment to enter an undefined state, since they do not have knowledge of the OFDM, nor the capability to receive it.

Figures 4A, 4B:
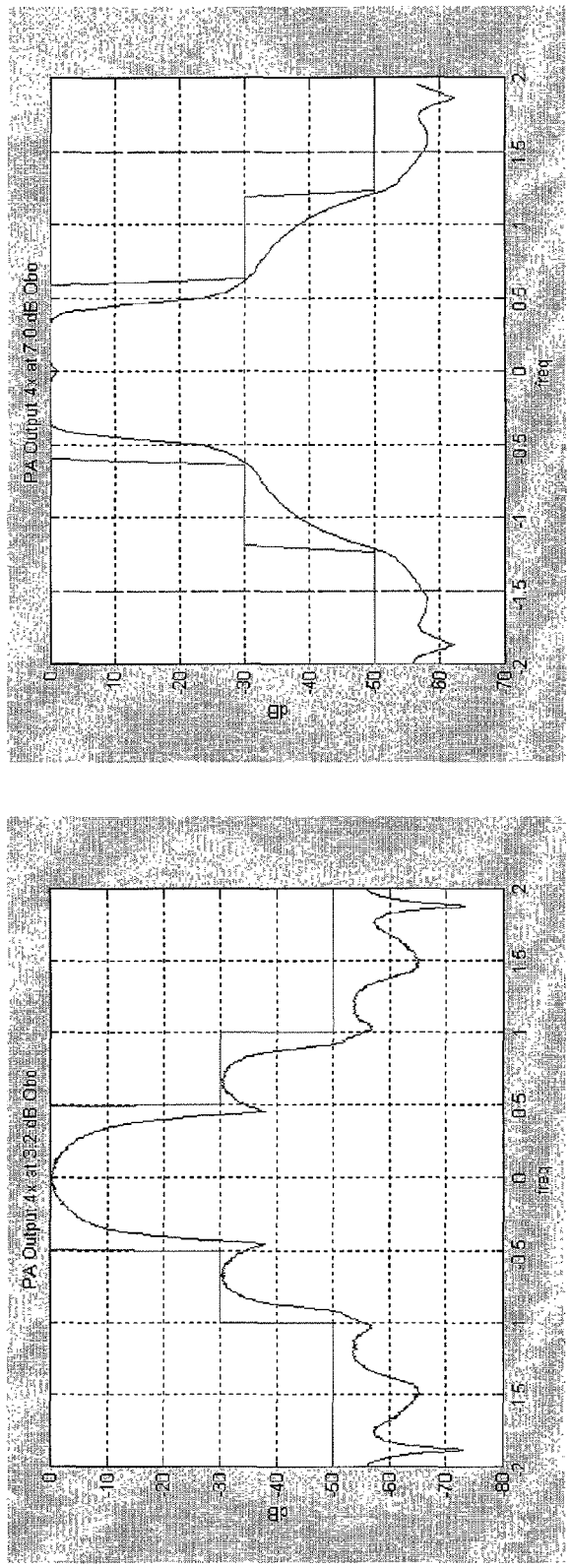
FIGS. 4A and 4B are graph diagrams of plots of the spectrum of the 802.11b Barker chips and the 802.11a OFDM, respectively.
Figure 5B:
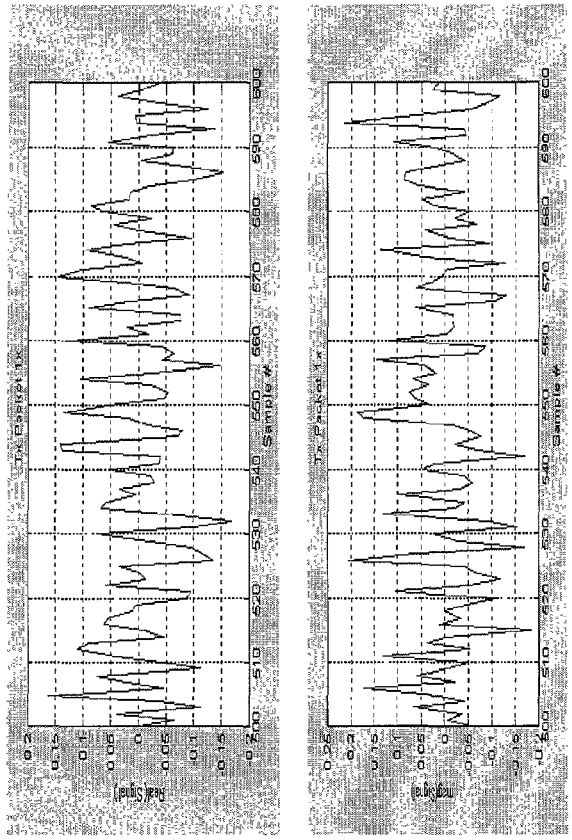
FIGS. 5A and 5B are graph diagrams of time domain plots of the 802.11b QPSK Barker chips and the 802.11a OFDM, respectively, illustrating that the waveforms are radically different.
Figure 5A:
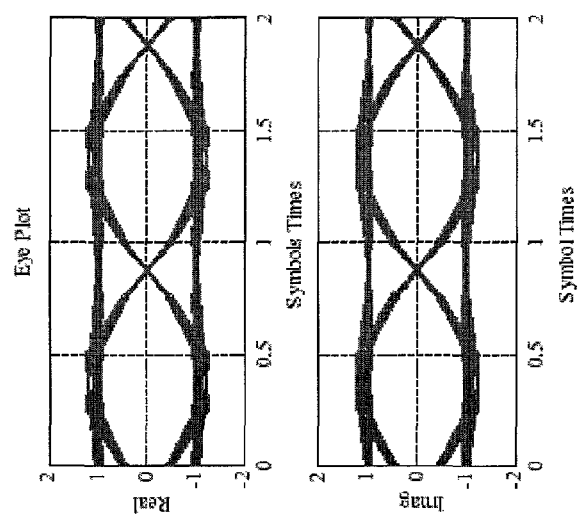

FIGS. 4A and 4B are graph diagrams of plots of the spectrum of the 802.11b Barker chips and the 802.11a OFDM, respectively, in decibels (dB) versus normalized frequency (freq). Spectrum refers to center frequency, power spectral density, and frequency response. The 802.11b Barker chip spectrum has a round "top" whereas the 802.11a OFDM spectrum has a flat top. The 3 dB bandwidths are also different. FIGS. 5A and 5B are graph diagrams of time domain plots of the 802.11b QPSK Barker chips and the 802.11a OFDM, respectively, illustrating that the waveforms are radically different. It is desired to create a smooth transition between the preamble/header single-carrier portion 303, 305 and the OFDM symbol portion 307 even though the waveforms are different. One solution is to make the 802.11b Barker preamble and header look like OFDM with approximately the same transmit spectrum and approximately the same power.

Figure 6B:
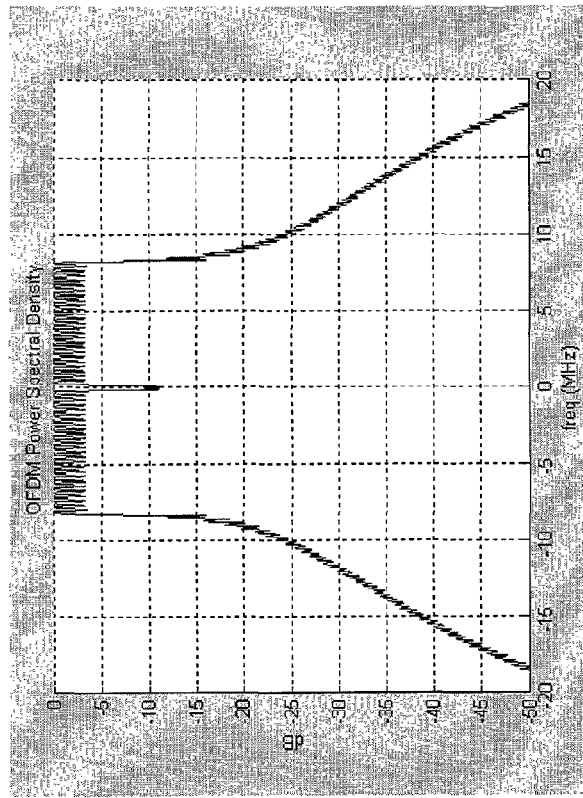
Figure 6A:
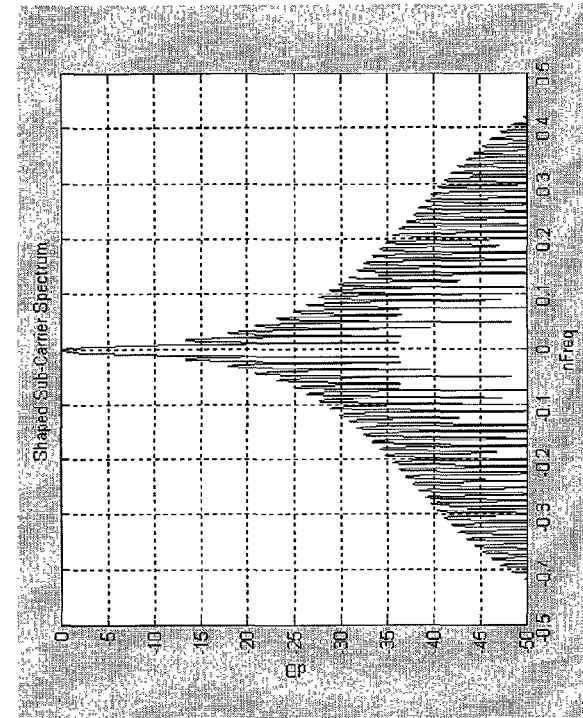
FIG. 6A is a graph diagram of a plot of the power spectral density (PSD) of a single sub-carrier out of the possible 64 possible sub-carriers defined in the 802.11a standard.

FIG. 6A is a graph diagram of a plot of the power spectral density (PSD) of a single sub-carrier out of the possible 64 possible sub-carriers defined in the 802.11a standard, in dB versus frequency. FIG. 6B is a graph diagram of a plot of the composite PSD of the 52 non-zero sub-carriers used in 802.11a. The curves are plotted versus normalized frequency (nfreq) and frequency in MHz, respectively. It is desired to design a spectrum/time shaping pulse, which makes the spectrum of the single-carrier portion of the signal resemble OFDM. This pulse is made known so that the receiver is able to compensate the CIR for the OFDM portion of the packet. The pulse is specified in continuous time, so that it is implementation independent. For digital implementations, the pulse may be sampled at any desired appropriate implementation rate. The signal should provide a nearly flat spectrum in the pass-band with sufficiently steep roll-off on the band edges. It is desired that the transmit pulse be easily handled by 802.11b legacy receivers. It should have a dominant peak, therefore, with a small amount of spread in the impulse response. This allows the 802.11b receiver to lock on to this impulse response component. It is desired that the signal have a short duration to minimize complexity.

Figure 7B:
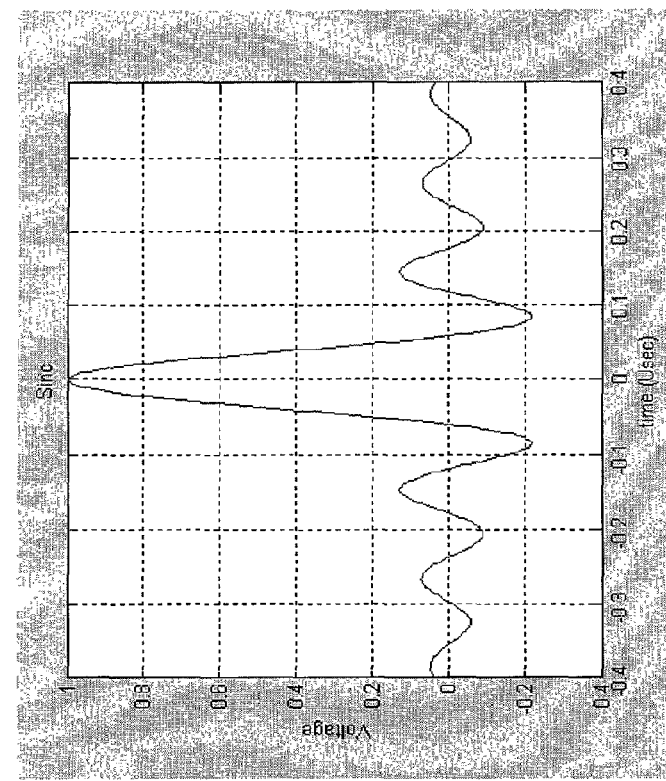
FIG. 7B is a graph diagram of a portion of the associated infinite-duration time response corresponding to the brickwall spectrum of FIG. 7A.
Figure 7A:
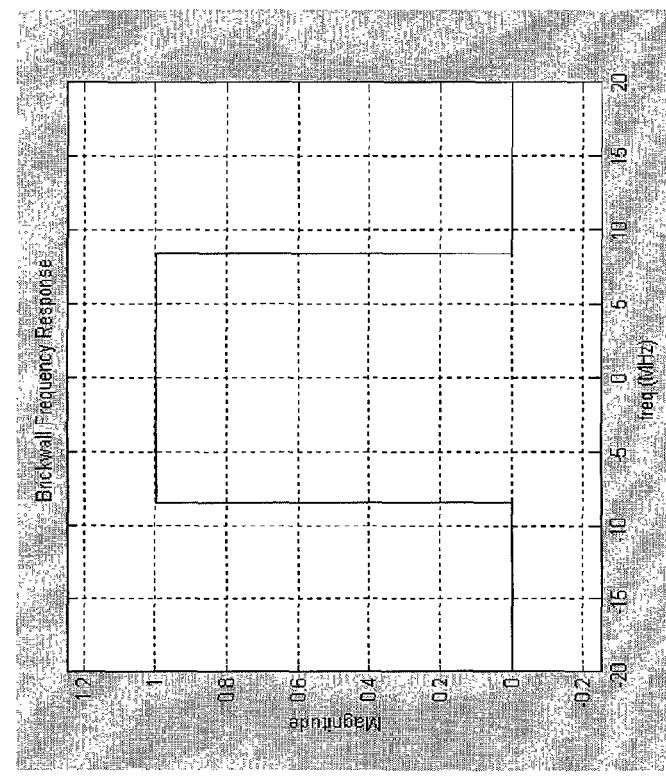
FIG. 7A is a graph diagram of a plot of an exemplary "brickwall" double-sided spectrum centered at 0 MHz.

FIG. 7A is a graph diagram of a plot of an exemplary "brickwall" double-sided spectrum centered at 0 MHz, having a magnitude of 1 at a selected bandwidth of approximately 2(8.5)=17 MHz and 0 otherwise. A brickwall spectrum is essentially an idealized low-pass filter. The exemplary frequency range is selected as (2)(27)(20 MHz/64)=16.875 MHz in the embodiment shown. FIG. 7B is a graph diagram of a portion of the associated infinite-duration time response corresponding to the brickwall spectrum. In general, a target spectrum is chosen for the single carrier system. This is done by specifying a brickwall approximation to the desired spectrum. A brickwall spectrum has an infinite impulse response in the time domain (i.e., spans from +/−infinity). The pulse is then truncated using a continuous-time window. A long enough window is chosen to give the desired spectral characteristics while a short enough window is chosen to minimize complexity, each generally employing engineering judgment.

Figure 8:
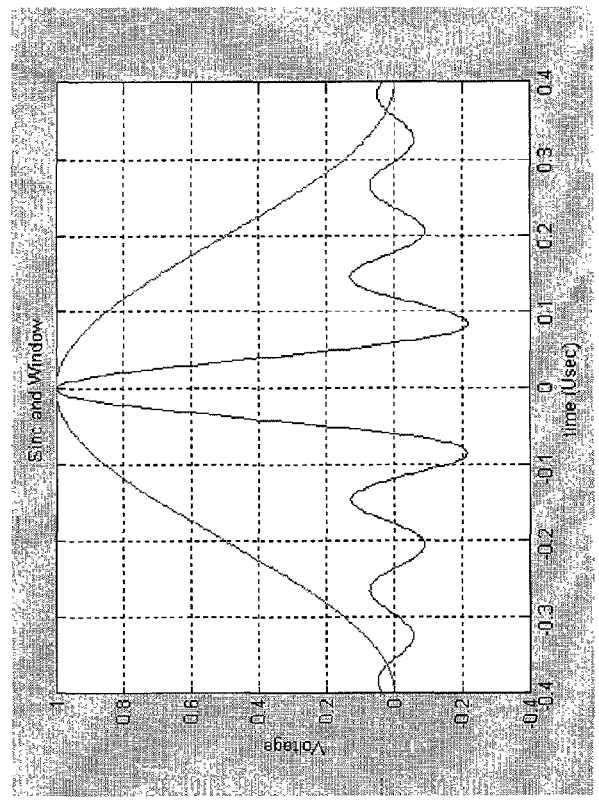
FIG. 8 is a graph diagram of a plot of an exemplary continuous-time window, which is a continuous time version of a Hanning window.
Figure 9:
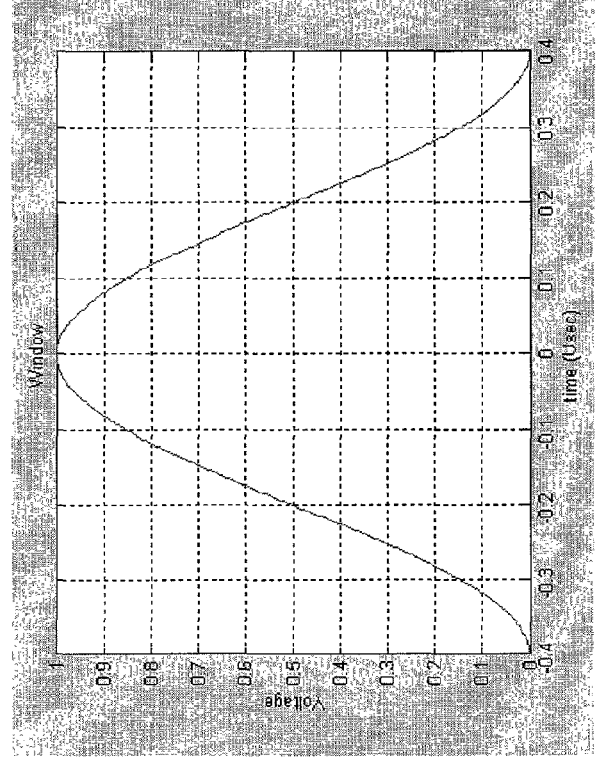
FIG. 9 is a graph diagram of a plot of the Hanning window of FIG. 8 overlayed with the portion of the infinite-duration time response corresponding to the brickwall spectrum of FIG. 7A.
Figure 10:
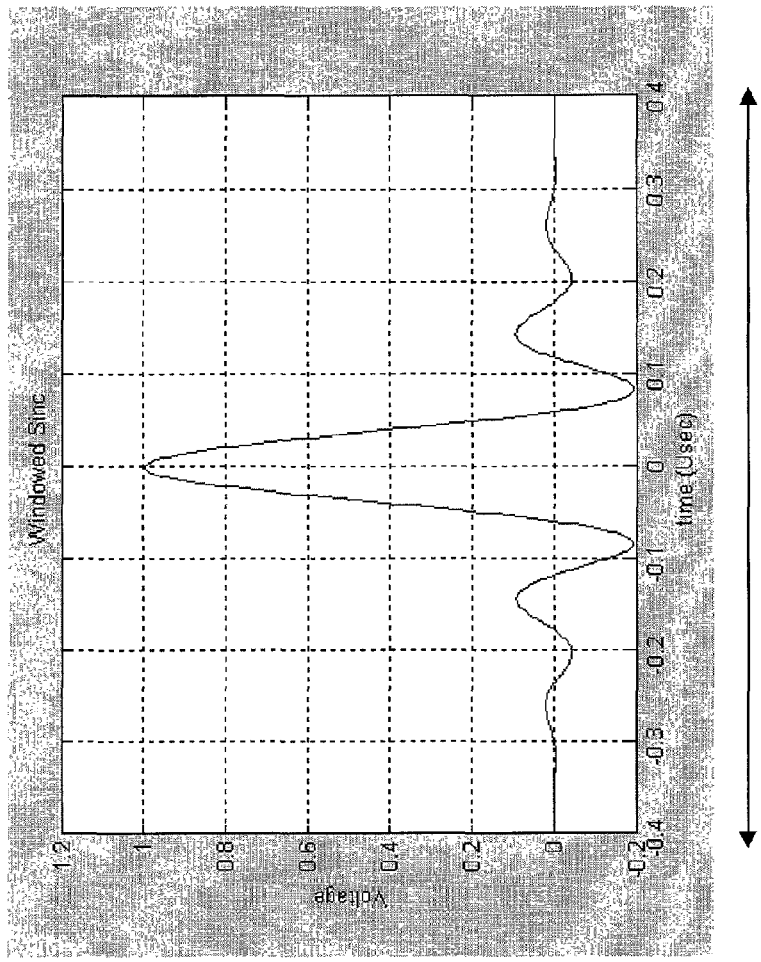
FIG. 10 is a graph diagram of a plot of the exemplary pulse p(t) resulting from the overlaying illustrated in FIG. 9 and truncated to approximately 0.8 μs.
Figure 11:
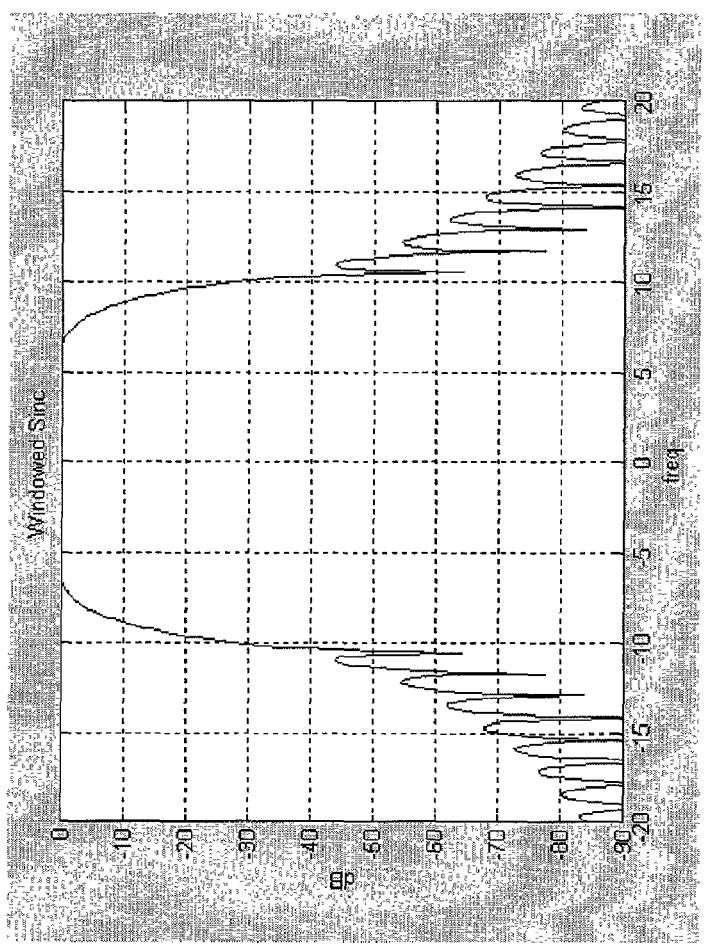
FIG. 11 is a graph diagram of a plot of the spectral characteristics of the pulse p(t) illustrating that it is a close match to the OFDM spectrum.

FIG. 8 is a graph diagram of a plot of an exemplary continuous-time window, which is a continuous time version of a Hanning window. It is appreciated that this is only one of many different window configurations that may be successfully employed to achieve desirable results. FIG. 9 is a graph diagram of a plot of the Hanning window overlayed with the portion of the infinite-duration time response corresponding to the brickwall spectrum. FIG. 10 is a graph diagram of a plot of the resulting exemplary pulse p(t) truncated to approximately 0.8 μs so that it is zero outside +/−0.4 μs. The short duration of the pulse p(t) provides low complexity. FIG. 11 is a graph diagram of a plot of the spectral characteristics of the pulse p(t) illustrating that it is a close match to the OFDM spectrum. The spectral characteristics of the pulse p(t)

include a nearly flat spectrum where OFDM is flat and a fast roll-off where OFDM rolls off. The continuous time pulse can be used to construct any digital filter unambiguously and is independent of particular implementations. The Nyquist criteria (sampling of the continuous time pulse) should be satisfied at the level of the target fidelity. The pulse p(t) is "digitized" or sampled according to the Nyquist criterion. In some embodiments, the samples are then decomposed as described further below.

Figure 12:
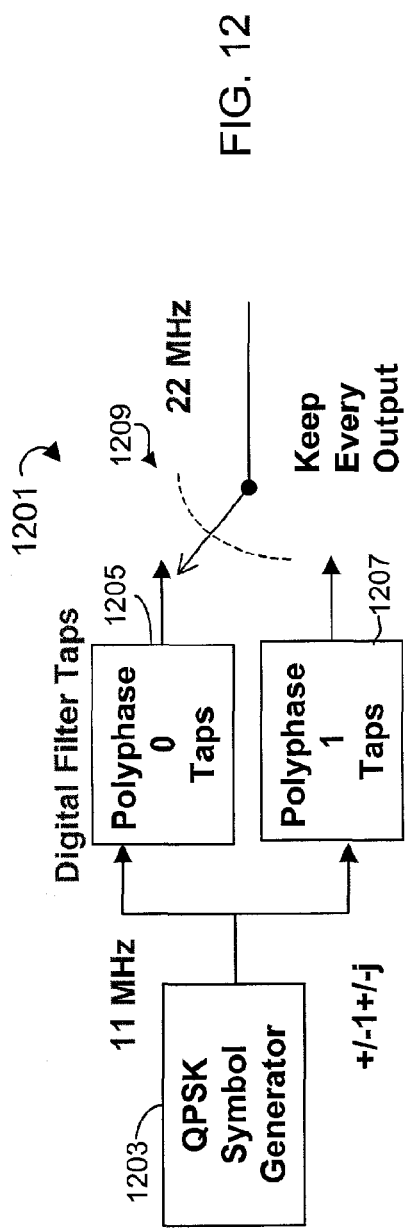
FIG. 12 is a block diagram of an exemplary digital filter employed to architect a digital 22 MHz output sample rate using the continuous time pulse p(t).
Figure 13:
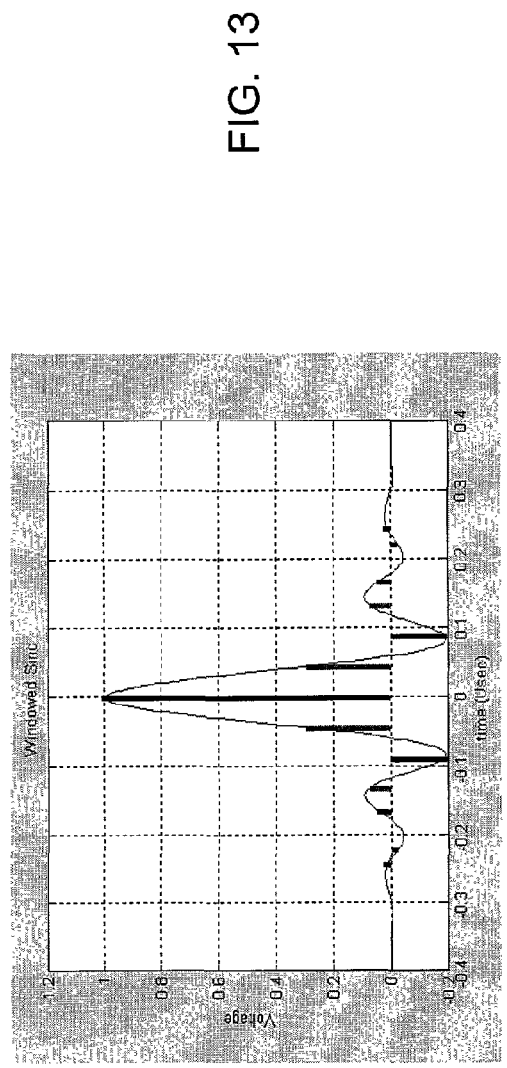
FIG. 13 is a graph diagram illustrating the sampling and polyphase decomposition of the continuous time pulse p(t) using the sampling scheme of FIG. 12.

FIG. 12 is a block diagram of an exemplary digital filter 1201 employed to architect a digital 22 MHz output sample rate using the continuous time pulse p(t). In this case, an exemplary QPSK symbol generator 1203 provides an 11 MHz signal to respective inputs of each of a pair of polyphase digital filters 1205 and 1207. The QPSK symbol generator 1203, used as an exemplary transmitter for illustration, passes each symbol (a complex number) to both of the digital filters 1205 and 1207 at a rate of 11 MHz each. Each digital filter 1205 and 1207 samples the input waveform and generates an output at 11 MHz. The digital filter taps 1205 are composed of even numbered samples and the digital filter taps 1207 are composed of odd numbered samples of the pulse p(t). Select logic 1209, such as multiplexor (MUX) circuitry or the like, selects every output of the polyphase digital filter taps 1205 and 1207 to achieve a 2(111)=22 MHz sample rate signal. FIG. 13 is a graph diagram illustrating the sampling and polyphase decomposition of the continuous time pulse p(t) (plotted versus time in microseconds, "μs"). Since every output of every filter is used, the effective sampling rate is 22 MHz.

Figure 14:
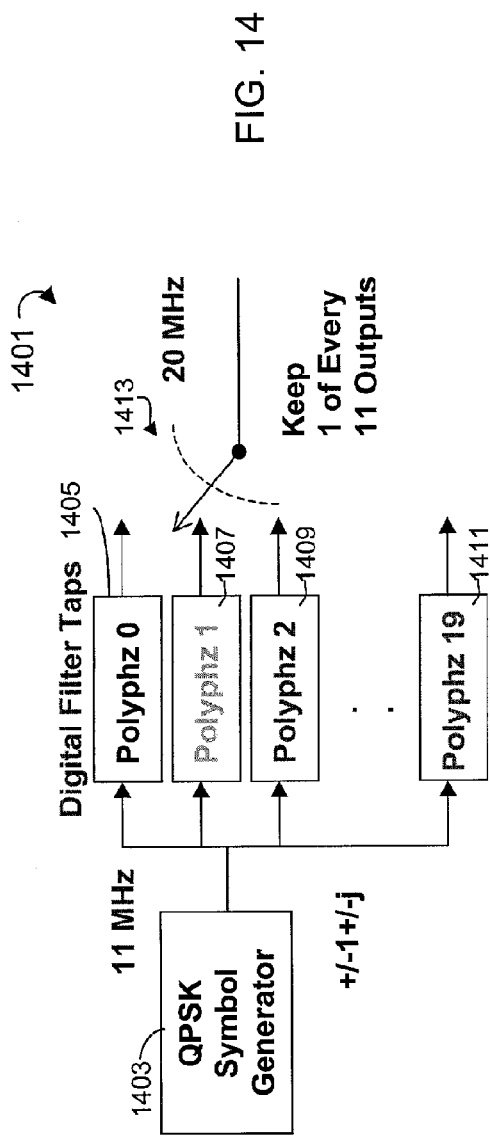
FIG. 14 is a block diagram of another exemplary digital filter employed to architect a digital 20 MHz output sample rate using the pulse p(t).
Figure 15:
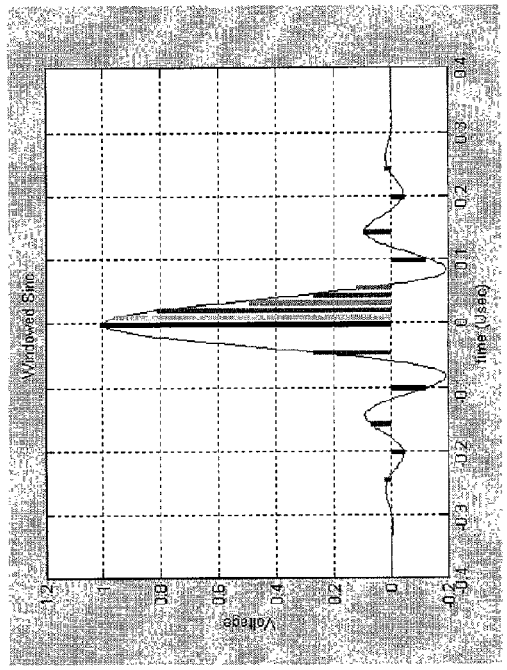
FIG. 15 is a graph diagram illustrating the sampling and polyphase decomposition of the continuous time pulse p(t) using the sampling scheme of FIG. 14.

FIG. 14 is a block diagram of another exemplary digital filter 1401 employed to architect a digital 20 MHz output sample rate using the pulse p(t). In this case, an exemplary QPSK symbol generator 1403, similar to the generator 1203, provides an 11 MHz signal to respective inputs of twenty polyphase digital filters 1405, 1407, 1409, . . . , 1411. Each digital filter 1405-1411 generates an output at 11 MHz, so that the sampling rate is increased from 11 MHz to 220 MHz. Each filter consists of the samples spaced 20 samples apart. Select logic 1413, such as multiplexor (MUX) circuitry or the like, selects one of every 11 outputs of the polyphase digital filters 1405-1411 to achieve a 20 MHz sample signal. For example, for the first QPSK symbol, the respective outputs of filters 1 and 11 are used and for the second QPSK symbol, the respective outputs of filters 19 and 10 are used, etc. Also, one out of every eleven input symbols will generate 1 output sample, whereas the remaining input samples each generate two output samples. FIG. 15 is a graph diagram illustrating the sampling and polyphase decomposition of the continuous time pulse p(t) plotted versus time. Since one out of every 11 outputs is used of the 220 MHz combined output of the filters 1405-1411, the effective sampling rate is 20 MHz.

Figure 16:
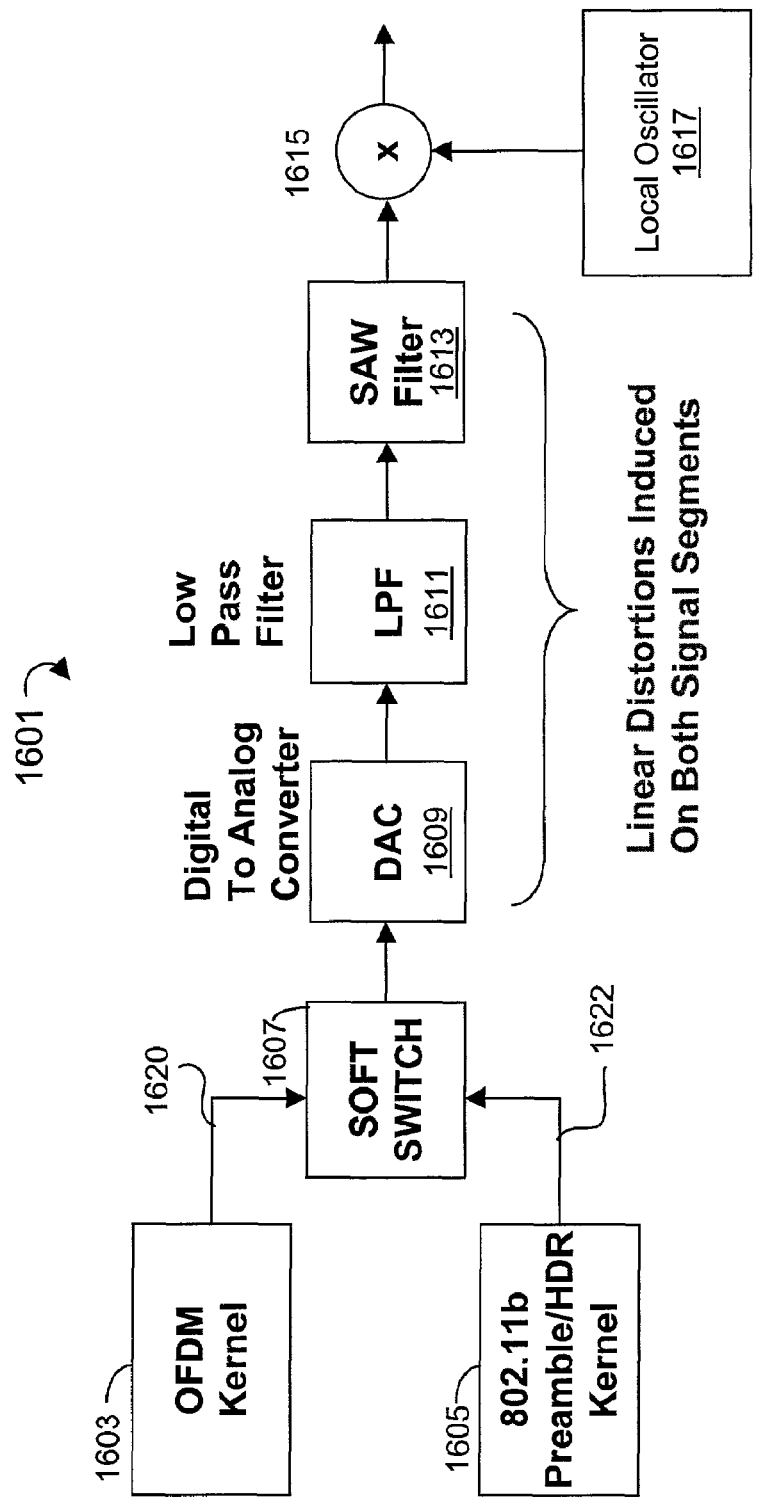
FIG. 16 is a block diagram of a transmitter implemented according to an embodiment of the present invention.

FIG. 16 is a block diagram of a transmitter 1601 implemented according to an embodiment of the present invention. The transmitter 1601 includes an OFDM Kernel block 1603 supplying the OFDM portion of the signal to a soft switch block 1607, which receives the 802.11b preamble and header portion from an 802.11b preamble/header Kernel block 1605. The soft switch block 1607 provides the 802.11g signal to a digital to analog converter (DAC) 1609, which provides a resulting analog signal to a low-pass filter (LPF) 1611. The filtered signal is provided to a SAW filter 1613, illustrating that linear distortions are induced on both signal segments. The output of the SAW filter 1613 is provided to one input of a mixer 1615, having another input which receives a local oscillator (LO) signal from a local oscillator 1617. The mixer 1615 asserts a mixed or combined signal at its output.

Distortions can be induced in the transmitter, multi-path channel and receiver. An obvious linear distortion in the transmitter is a SAW filter, such as the SAW filter 1613. In communications systems, it is frequently assumed that linear distortions are common and (essentially) time-invariant across waveform symbols. For example, linear distortions are assumed common between the preamble/header and payload portions for both 802.11a and 802.11b communications. In a similar manner, linear distortions of the transmit radio are assumed to be common to both the single-carrier segment and the multi-carrier segment. In this manner, a spectral binding requirement is imposed to allow the equalizer information and the AGC to carry over from single- to multi-carrier.

The transmitter 1601 further illustrates a sample-power matching scheme to enable the AGC information to carry over from single-carrier to multi-carrier portions of the signal. In particular, it is desired that the average signal power output from the OFDM Kernel block 1603, as shown at 1620, be approximately the same as the average signal power output from the 802.11b preamble/header Kernel block 1605, as shown at 1622.

Figure 17:
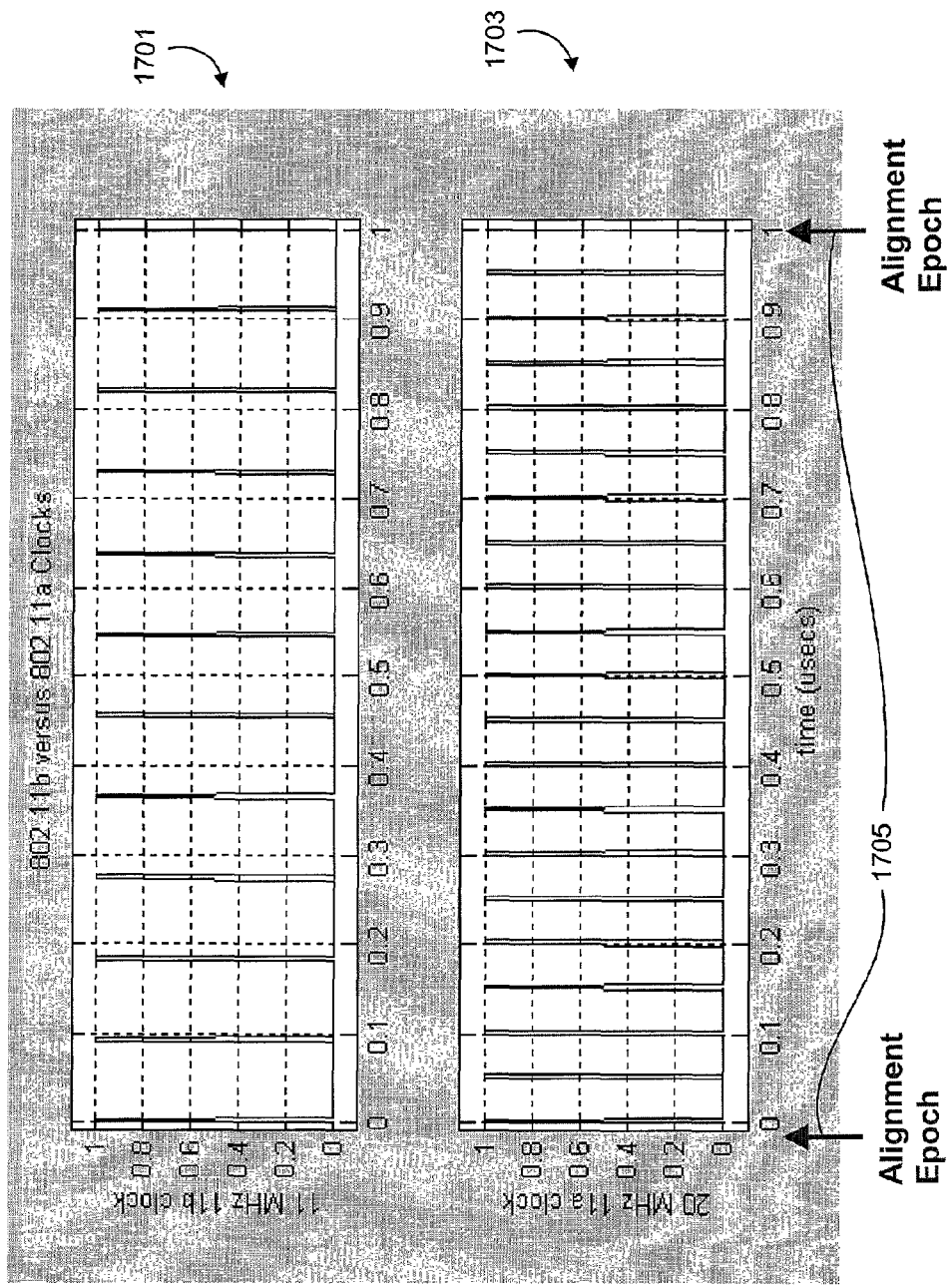
FIG. 17 is a graph diagram comparing the 11 MHz Barker chip clock versus the 20 MHz OFDM sample clock.
Figure 18:
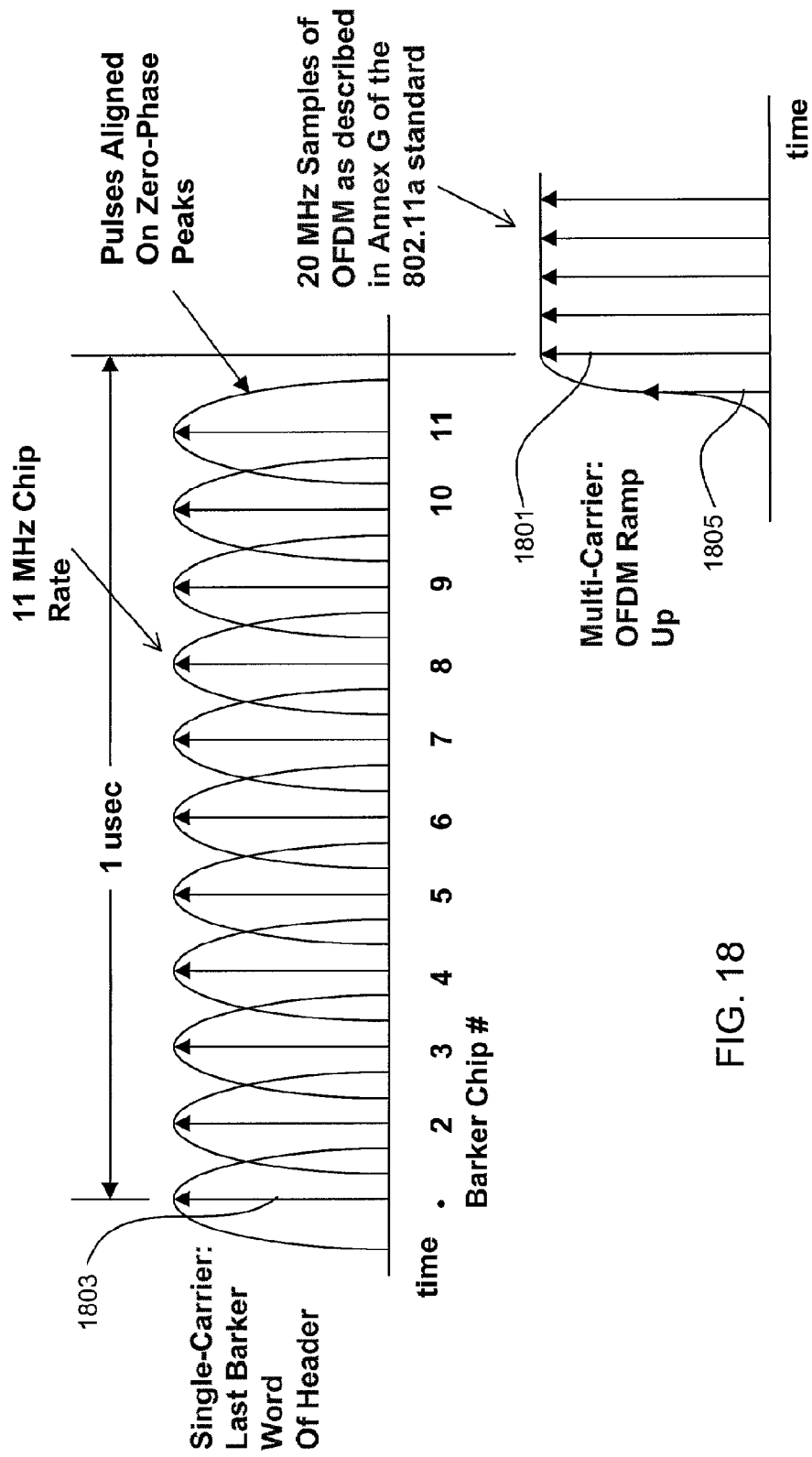
FIG. 18 is a conceptual graph diagram illustrating alignment of the OFDM signal portion with the last Barker word of the header of the single-carrier portion.

FIG. 17 is a graph diagram comparing the 11 MHz Barker chip clock shown at 1701 versus the 20 MHz OFDM sample clock shown at 1703, both plotted versus time in μs. The 802.11b communication scheme uses a chip rate of 11 MHz. The 802.11b preamble/header uses 11 chip Barker words, so that there are 11 chips/s. The 802.11a OFDM uses a 20 MHz sample rate. In the embodiment shown, in order to achieve transition time alignment, the 802.11b (11 MHz) and 802.11a (20 MHz) signal segments are aligned at the 1 MHz boundary, every 1 μs interval, illustrated by alignment epochs 1705 at each 1 μs interval. FIG. 18 is a conceptual graph diagram illustrating alignment of the OFDM signal portion with the last Barker word of the header of the single-carrier portion. The first chip of each Barker word, shown at 1803, is centered on the 1 μs alignment. The first fill 20 MHz sample of the OFDM signal, shown at 1801, occurs 1 μs after the zero-phase peak of first chip of the last Barker word in the header. Effectively, one half-scale OFDM sample, shown at 1805, occurs before the full scale sample (for smoothing). Such transition time alignment allows the equalizer information and the timing information to carry over between the single- and multi-phase portions of the signal.

Figure 19:
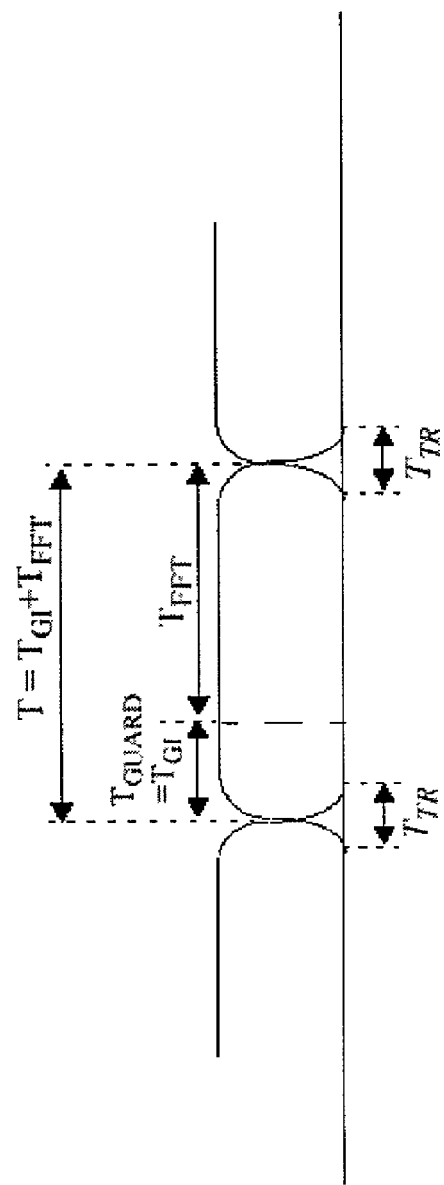
FIG. 19 is a graph diagram illustrating normal OFDM symbol overlap.
Figure 20:
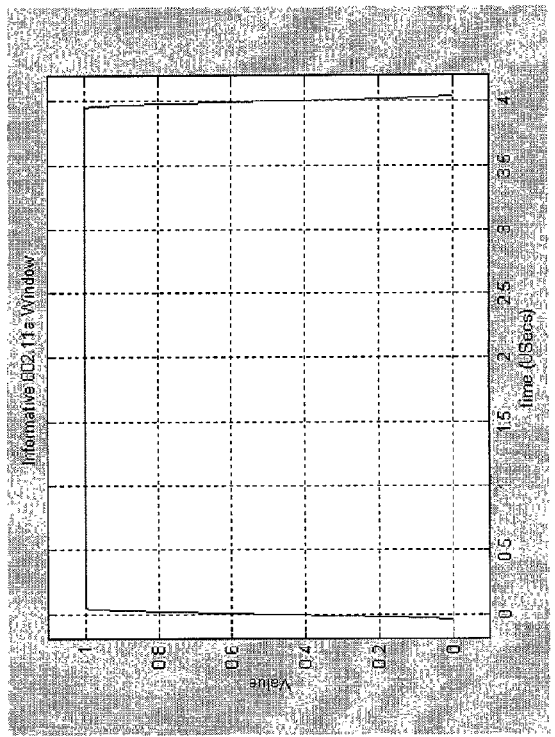
FIG. 20 is a graph diagram illustrating exemplary 802.11a OFDM symbol onset and termination.
Figure 21:
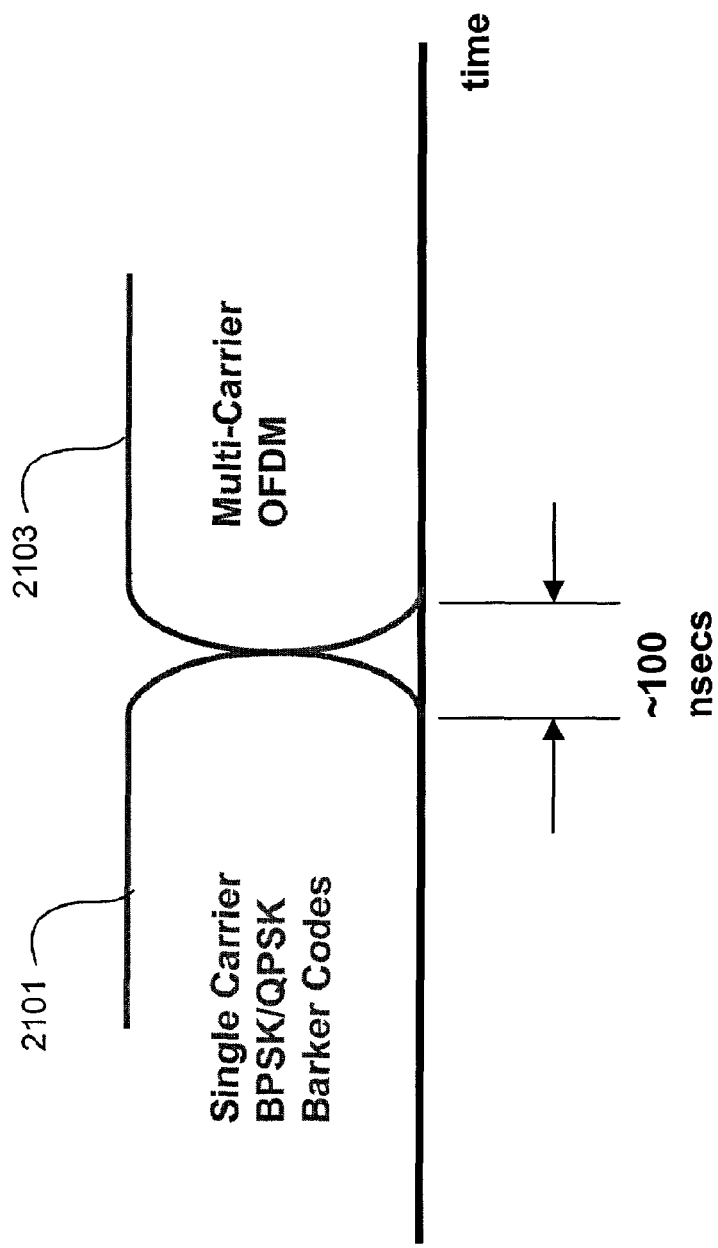

FIG. 19 is a graph diagram illustrating normal OFDM symbol overlap. FIG. 20 is a graph diagram illustrating exemplary 802.11a OFDM symbol onset and termination. FIG. 21 is a graph diagram illustrating exemplary single-carrier termination, shaped consistent with 802.11a as shown at 2101, and OFDM onset shaped identical to 802.11a, as shown at 2103. As illustrated in these graph diagrams, the single-carrier is terminated in a controlled fashion when transitioning from single-carrier to multi-carrier. This single-carrier termination maintains the AGC at the point of transition, minimizes the signal power gap, which in turn minimizes the corruption of one signal by the other. The single-carrier termination of the 802.11b segment is similar to that used for 802.11a OFDM shaping. 802.11a specifies a windowing function for OFDM symbols, which is employed to define termination of single-carrier segment. The single-carrier signal is terminated in a predetermined window of time, such as nominally 100 nanoseconds (ns). It is not necessary to completely flush the single-carrier pulse-shaping filter. The resulting distortion to the last Barker word in the header is trivial compared to the 11 chips processing gain, thermal noise and multi-path distortion. The termination may be accomplished either explicitly in the digital signal processing or by analog filtering.

It is further desired that the carrier frequency be coherent for both waveform segments, achieved by using a single LO signal via the local oscillator 1617. This allows the equalizer information to carry over. Carrier frequency lock may be maintained with a phase-lock loop (PLL) circuit or the like.

Figure 22B:
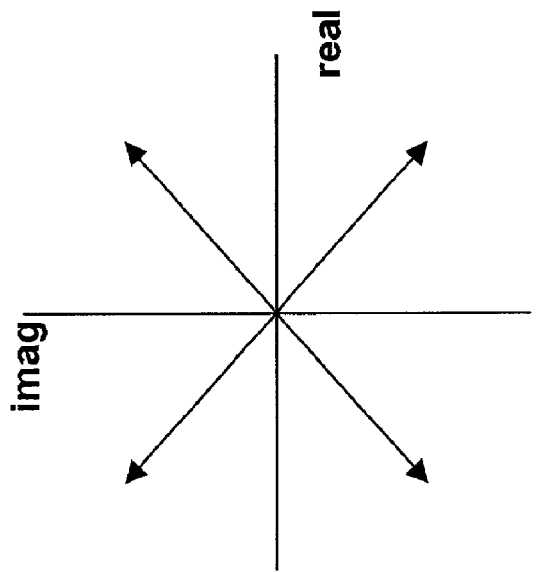
FIG. 22B is a simplified graph diagram of a QPSK plot illustrating that QPSK incorporates both real and imaginary portions in all four quadrants (1 of 4 phases).
Figure 22A:
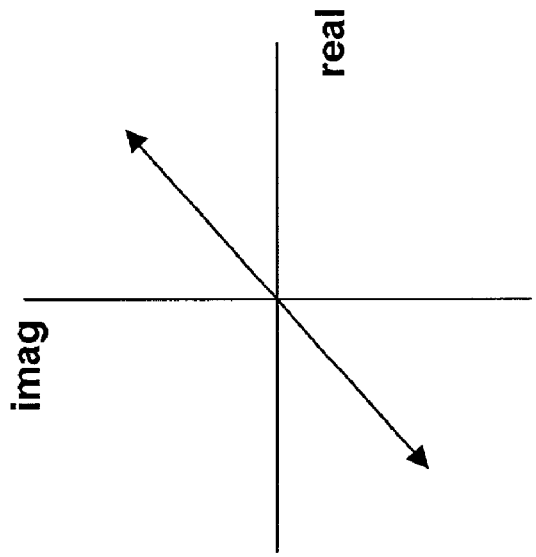
FIG. 22A is a simplified graph diagram of a BPSK plot illustrating that BPSK incorporates both real and imaginary portions in two quadrants (1 of 2 phases).

It is further desired that the carrier phase be aligned, which allows the equalizer information to carry over. FIG. 22A is a simplified graph diagram of a BPSK plot illustrating that BPSK incorporates both real and imaginary portions in two quadrants (1 of 2 phases). FIG. 22B is a simplified graph diagram of a QPSK plot illustrating that QPSK incorporates both real and imaginary portions in all four quadrants (1 of 4 phases). The single-carrier signals, employing Direct Sequence Spread Spectrum (DSSS), are fundamentally different as compared to the OFDM signal format and modulation schemes. For 802.11g CCK-ODFM, either of these formats are re-used for the header.

Figure 23:
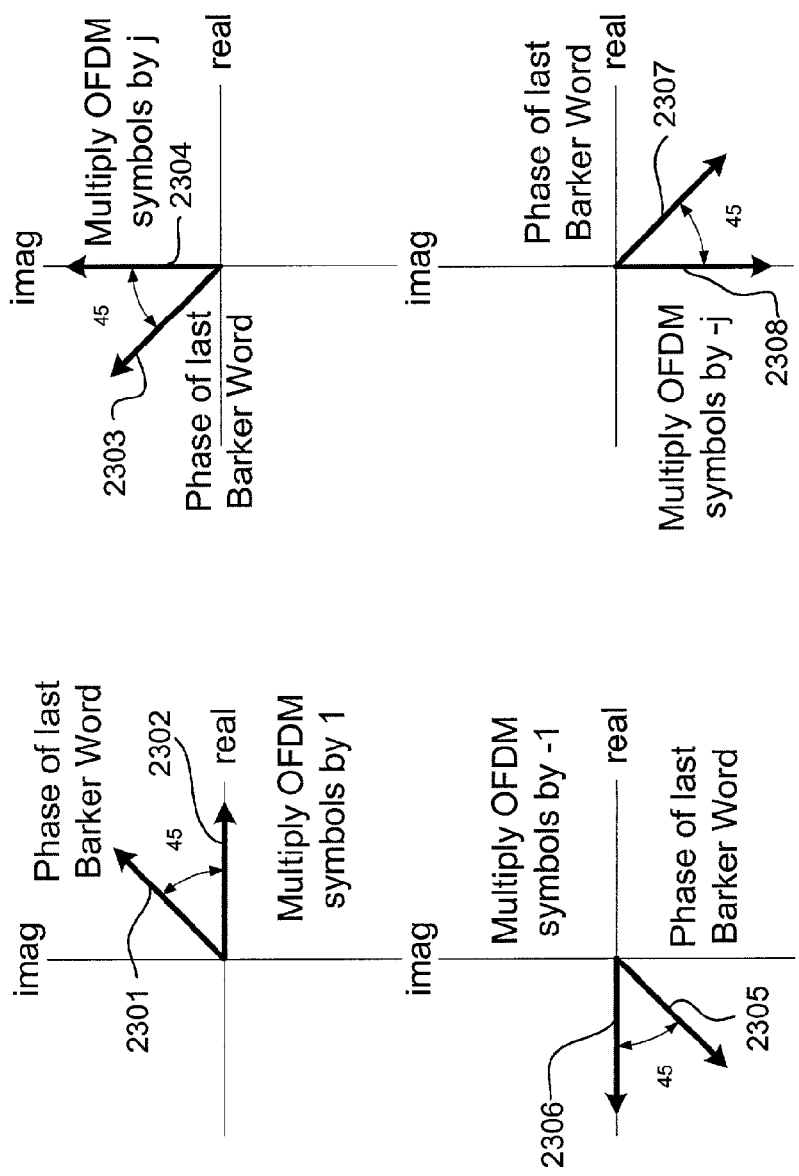
FIG. 23 is a graph diagram of a plot illustrating the phase of the last Barker word in the 802.11g header and the relative phase of the OFDM symbol in accordance with that described in Annex G of the 802.11a standard.

FIG. 23 is a series of graph diagrams illustrating the phase relationship between the last Barker word, rather than the last chip, in the 802.11g header and subsequent OFDM symbol samples. Annex G of the 802.11a standard describes how to transmit an OFDM symbol including real and imaginary components. The arrows shown at 2301, 2303, 2305 and 2307 illustrate the four possible phases of the last Barker word. The phase of the OFDM symbol is determined by the phase of the last Barker word, in that each OFDM sample is either not rotated or rotated by the same, predetermined amount based on the phase of the last Barker word. The arrows shown at 2302, 2304, 2306 and 2308 represent the corresponding four relative phase shifts applied to the OFDM symbol corresponding to the Barker phase illustrated by arrows 2301, 2303, 2305 and 2307, respectively. For example, if the phase of the last Barker word is in the first quadrant, then the phase of the OFDM symbols will be rotated by zero degrees (not rotated, or multiplied by 1) relative to the OFDM phase as described in Annex G of the 802.11a standard. Furthermore, if the phase of the last Barker word is in the second quadrant (135 degree phase rotation), then the phase of the OFDM symbols will be rotated by 90 degrees relative to the phase of the samples in 802.11a Annex G (i.e., multiplied by "j"); if the phase of the last Barker word is in the third quadrant (−135 degree phase rotation), then the phase of the OFDM symbols will be rotated by 180 degrees relative to the phase of the samples in 802.11a Annex G (i.e., multiplied by "−1"); and if the phase of the last Barker word is in the fourth quadrant (−45 degree phase rotation), then the phase of the OFDM symbols will be rotated by −90 degrees relative to the phase of the samples in 802.11a Annex G (i.e., multiplied by "−j").

In many design implementations, it is often desired to know the relative accuracy and fidelity requirements to maintain signal integrity and compatibility among different transceivers. In this manner, designers are able to reduce costs and maximize efficiency while maintaining parameters and characteristics within specification. The accuracy characteristic constrains the short-cuts the transmit designer may make which may otherwise significantly harm receiver performance. In one embodiment, the requisite fidelity of the entire waveform behavior is established using a metric based on the fidelity requirements of the OFDM signal of the 802.11a standard. Thus, the requisite fidelity of the single-carrier portion is the same as the multi-carrier portion even though the single-carrier portion is typically at a reduced data rate. As described in the 802.11a specification, the requisite fidelity for OFDM is set by the error vector magnitude (EVM) specification, as illustrated in the following Data Rate versus EVM Table 1:

TABLE 1

Data Rate versus EVM specification

| Data Rate Mbps | EVM Spec |
|---|---|
| 6 | −5 |
| 9 | −8 |
| 12 | −10 |
| 18 | −13 |
| 24 | −16 |
| 36 | −19 |
| 48 | −22 |
| 54 | −25 | where data rate is specified in Mbps and EVM is specified in dB. As illustrated in Table 1, the OFDM accuracy is a function of the data rate. The higher the data rate, the more complex and intricate the transmit waveform, and the greater the accuracy necessary. This requisite fidelity is applied to the entire waveform. EVM is the same thing as mean-squared-error (MSE) normalized by the signal power. MSE may be measured after best-fit time alignment, best-fit gain alignment, and best-fit phase alignment. Also, linear distortion common to OFDM and the single-carrier Barker chips may be backed-out, if desired. If and when the 802.11b accuracy specification becomes more stringent, it may be used for the single-carrier portion.

Portions of 802.11b specification and all of the 802.11a specification employ a locked-oscillator requirement. A locked oscillator characteristic allows timing tracking information to be derived from carrier frequency and phase. There are two fundamental clocks in a transmit waveform: a symbol rate clock and a carrier frequency. In at least one embodiment of the transmitter, all of the 802.11g signals have a symbol rate clock and carrier frequency derived from the same clock reference. It is further desired that the part-per-million (PPM) error on these two clock signals be equal. The receiver is allowed to track symbol rate timing from carrier frequency error.

The multi-carrier receiver 209 portion of the mixed signal receiver 201 obtains the behavior of the transition from the single-carrier receiver 207 of the waveform as described herein to receive the ODFM portion of the signal. The carrier frequency and phase is coherent. Furthermore, the time alignment, the signal level (AGC), and the channel impulse response (CIR) are each coherent. The single-carrier receiver 207 determines the CIR estimate during the single-carrier portion. The multi-carrier receiver 209 modifies the CIR estimate for the OFDM using the known pulse shape used by the single-carrier segment. In particular, the equalizer taps of the multi-carrier receiver 209 are modified using the known pulse shape used by the transmitter during the single-carrier preamble and header. In this manner, the multi-carrier receiver 209 does not have to reacquire the OFDM portion of the signal, but uses the information obtained by the single-carrier receiver 207 along with predetermined or known information for a smooth single-carrier to multi-carrier signal transition. Also, a separate OFDM preamble/header is not necessary, although it may be employed for both convenience and fine tuning, if desired.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention.

What is claimed is:

1. A device, comprising:
a modulator configured to modulate a first portion of a packet according to a single-carrier modulation scheme and second portion of the packet according to a multi-carrier modulation scheme, wherein the first portion of the packet is modulated at a first sample rate and the second portion of the packet is modulated at a second sample rate, and wherein the second sample rate is greater than the first sample rate,
wherein the first portion of the packet includes a preamble and a header,
wherein the header includes a mixed-mode identifier, and
wherein the second portion of the packet includes orthogonal frequency-division multiplexing (OFDM) symbols including payload data.

2. The device of claim 1, wherein the preamble is a Barker preamble, and wherein the header is a Barker header.

3. A device, comprising:
a demodulator configured to demodulate a first portion of a packet modulated according to a single-carrier modulation scheme at a first sample rate, and demodulate a second portion of the packet modulated according to a multi-carrier modulation scheme at a second sample rate, and wherein the second sample rate is greater than the first sample rate,
wherein the first portion of the packet includes a preamble and a header,
wherein the header includes a mixed-mode identifier, and
wherein the second portion of the packet includes orthogonal frequency-division multiplexing (OFDM) symbols including payload data.

4. The device of claim 3, wherein the preamble is a Barker preamble, and wherein the header is a Barker header.

5. The device of claim 3, wherein the packet is a mixed waveform packet.

6. A method comprising:
modulating a first portion of a mixed waveform generated using a first sample rate according to a single-carrier modulation scheme, wherein the first portion of the mixed waveform comprises a preamble and a header, and the header comprises a mixed mode identifier and at least one codeword;
modulating a second portion of the mixed waveform generated using a second sample rate according to a multi-carrier modulation scheme, wherein the second sample rate is greater than the first sample rate; and
adjusting a phase of the second portion of the mixed waveform to provide a coherent transition between the first portion of the mixed waveform and the second portion of the mixed waveform based on a phase of a last codeword of the at least one codeword.

7. The method of claim 6, wherein the multi-carrier modulation scheme is orthogonal frequency division multiplexing (OFDM).

8. The method of claim 6, wherein the at least one codeword comprises a plurality of codewords, and the phase of the second portion of the mixed waveform is adjusted based on the phase of the last codeword of the plurality of codewords.

9. The method of claim 6, wherein power, carrier phase, carrier frequency, timing, and multi-path spectrum are substantially maintained between the first portion and the second portion of the waveform.

10. The method of claim 9, wherein the first portion is modulated with a single-carrier modulation scheme kernel, wherein the second portion is modulated with a multi-carrier modulation scheme kernel, and wherein the average output signal power of the single-carrier modulation scheme kernel and the average output signal power of the multi-carrier modulation scheme kernel are maintained substantially equal.

11. The method of claim 6, wherein the single-carrier modulation scheme employs a single-carrier spectrum that resembles a multi-carrier spectrum of the multi-carrier modulation scheme.

12. The method of claim 6, wherein the linear distortions of the first and second portions of the waveform are assumed to be common.

13. The method of claim 6, wherein the single-carrier modulation scheme is according to 802.11b Barkers and wherein the multi-carrier modulation scheme is according to the 802.11a standard employing orthogonal frequency division multiplexing (OFDM).

14. The method of claim 6, wherein the single-carrier modulation scheme employs a first sample rate clock, wherein the multi-carrier modulation scheme employs a second sample rate clock, and wherein the first and second sample rate clocks are aligned at predetermined timing intervals.

15. The method of claim 6, wherein a first full sample of the multi-carrier modulation scheme begins one timing interval after the beginning of the last sample of the single-carrier modulation scheme.

16. The method of claim 15, wherein the single-carrier modulation scheme uses 11 chip Barker words at an 11 MHz sample rate, wherein each predetermined timing interval is approximately 1 microsecond, wherein the Barker chips are centered on the timing intervals, wherein the multi-carrier modulation scheme uses OFDM at a 20 MHz sample rate, and wherein the first full OFDM sample occurs at approximately 1 microsecond after a zero-phase peak of a first chip of the last Barker word of the first portion of the waveform.

17. The method of claim 6, wherein carrier phase of the multi-carrier signal is determined by carrier phase of a last portion of the single-carrier signal.

* * * * *